No. 756,414. PATENTED APR. 5, 1904.
L. SACK.
PLOW.
APPLICATION FILED SEPT. 2, 1903.
NO MODEL. 2 SHEETS—SHEET 1.
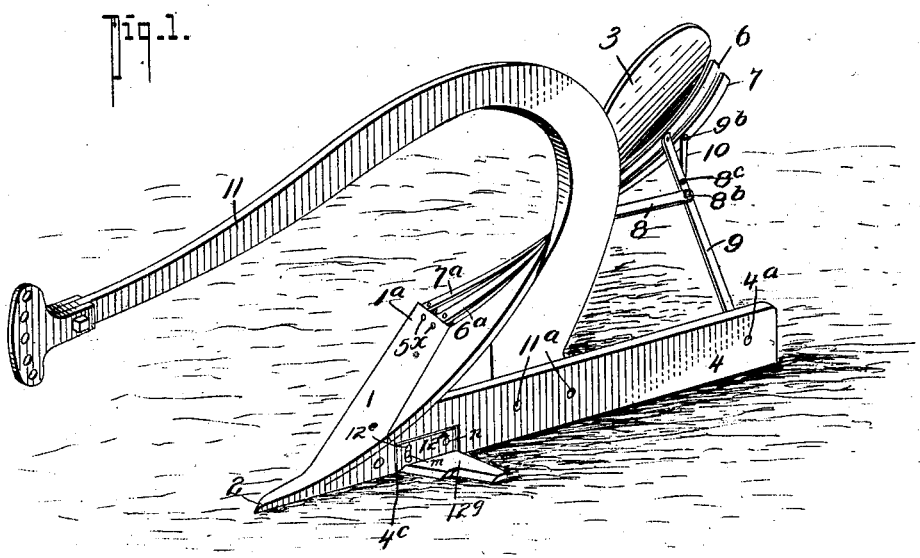
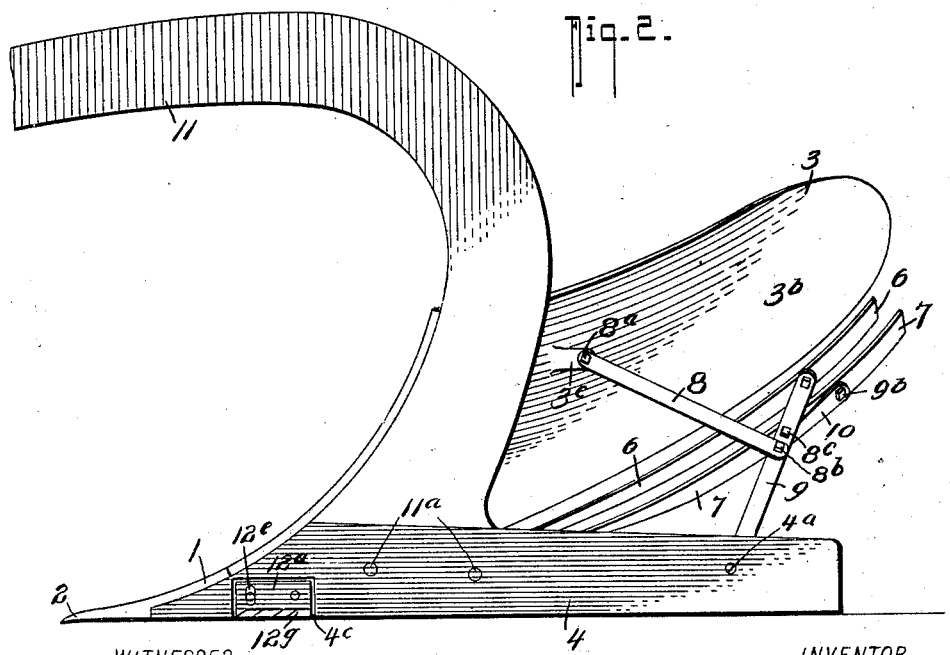
WITNESSES:
F. C. Gibson.
John T. Schrott
INVENTOR
Lawrence Sack.
BY
Fred G. Dieterich
ATTORNEYS.

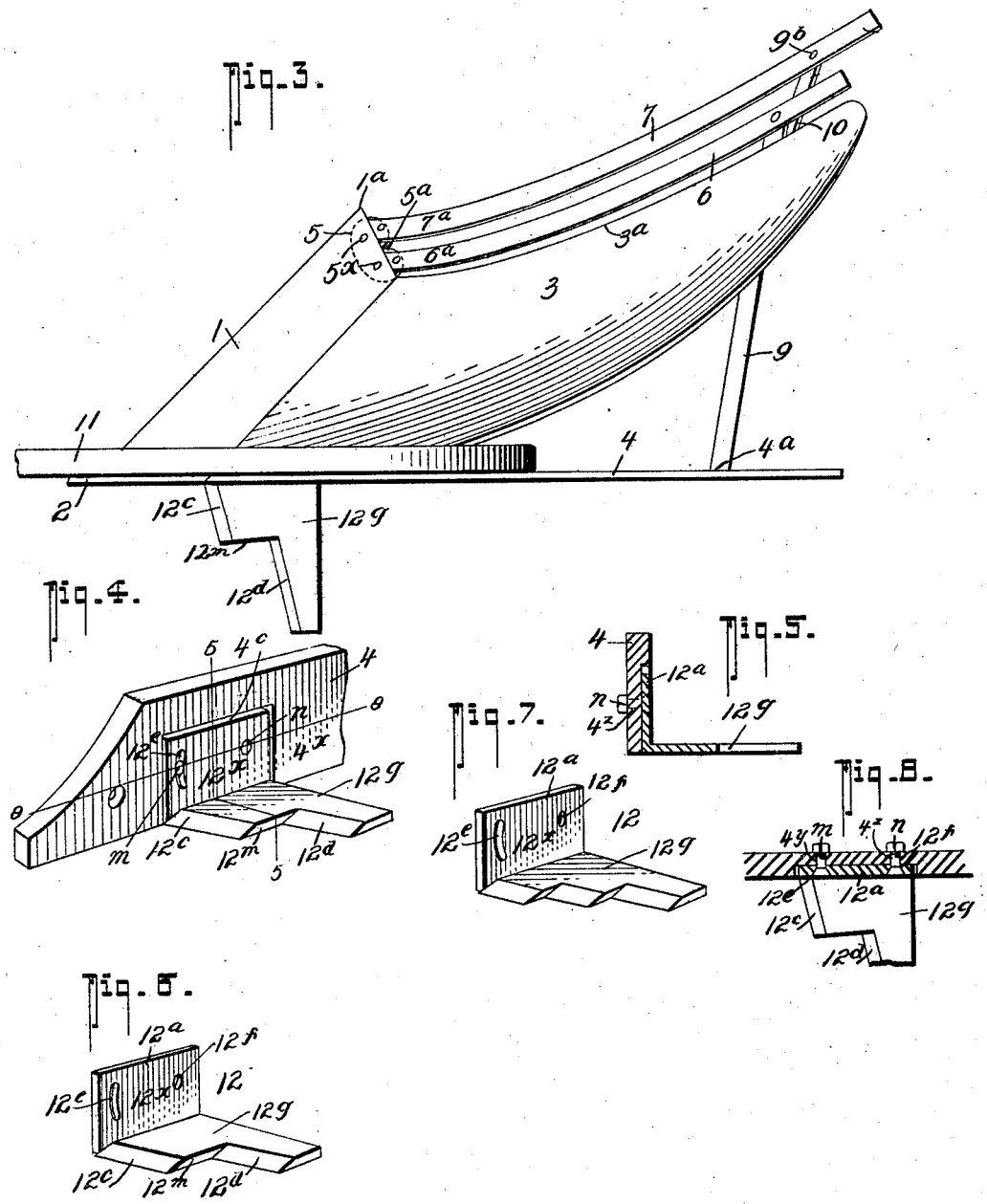

No. 756,414. Patented April 5, 1904.

UNITED STATES PATENT OFFICE.

LAWRENCE SACK, OF FARWELL, NEBRASKA.

PLOW.

SPECIFICATION forming part of Letters Patent No. 756,414, dated April 5, 1904.

Application filed September 2, 1903. Serial No. 171,622. (No model.)

*To all whom it may concern:*

Be it known that I, LAWRENCE SACK, residing at Farwell, in the county of Howard and State of Nebraska, have invented certain new and useful Improvements in Plows, of which the following is a specification.

My invention relates to plows; and it more particularly seeks to provide a plow which will insure a more perfect center draft and which will prevent the usual side draft on plows now in common use.

In its more generic nature my invention comprehends an auxiliary cutter knife or share secured to the landside of the plow and a peculiar construction of braces for the moldboard and which are so arranged as to form a continuance of the moldboard and which cutter is so mounted and constructed as to be of various adjustments to enable it to be set to the desired angle.

Again, my invention seeks to provide a plow of this character which while being of a simple and durable construction will readily serve its intended purposes, and the auxiliary cutter knife or share will also serve as a stalk-cutter.

With other objects in view, which will be hereinafter apparent, the invention consists in certain novel combination and structural arrangement of parts, all of which will be first described in detail and then specifically pointed out in the appended claims, reference being had to the accompanying drawings, in which—

Figure 1 is a perspective view of a plow constructed in accordance with my invention. Fig. 2 is a side elevation thereof looking at the landside. Fig. 3 is a top plan view thereof. Fig. 4 is a detail view, on an enlarged scale, of the cutter-knife and manner of attaching the same. Fig. 5 is a cross-section on the line 5 5 of Fig. 4. Fig. 6 is a perspective view of the cutter-knife. Fig. 7 is a detail view of a slightly-modified form thereof. Fig. 8 is a horizontal section on the line 8 8 of Fig. 4.

Referring now to the accompanying drawings, in which like numerals of reference indicate like parts in all the figures, 1 designates the plowshare having the usual point 2, while the moldboard is designated by 3 and the landside by 4.

To the plowshare 1, at the outer edge $1^a$ thereof and on the under side of the plowshare, I bolt a B-shaped plate 5, having suitable bolt-apertures to receive the bolts $5^x$, and the said plate 5 has apertured ears $5^a$, to which the bars 6 and 7 are joined at the end $6^a$ $7^a$ thereof, and the said bars are so bent and shaped as to run parallel with the edge $3^a$ of the moldboard 3 to serve, as it were, as a continuation of the moldboard. These two bars 6 and 7 run parallel to each other and in the ordinary-sized plow are spaced about two inches apart, and the bar 6 is spaced about two inches from the edge $3^a$ of the moldboard 3 for a purpose presently explained.

The under side $3^b$ of the moldboard 3 is formed with an integral lug $3^c$, to which the brace-bar 8 is securely bolted, as at $8^a$, and the said bar runs diagonally under the moldboard 3 and joins with the cross-brace 9 by the bolt $8^b$, and the said cross-brace 9 is joined at one end to the landside 4, as at $4^a$, (see Fig. 2,) and at the other end the brace-bar 9 joins with the bar 6, as clearly shown in Fig. 2.

10 designates a brace or bracket arm which is securely bolted at one end to the cross-bar 9 by the bolt $8^c$, and at its other end it is bolted, as at $9^b$, to the outer end of the bar 7, as clearly shown in Fig. 2.

11 designates the usual plow draft-beam, which is secured to the landside 4 by the bolts $11^a$ $11^a$ in the usual manner. Between the plow-point 2 and the bolts $11^a$ $11^a$ the landside has a rectangular cut-away portion (designated by $4^c$) to receive the auxiliary share or knife 12, which consists of a rectangular portion $12^a$ of slightly smaller area than the rectangular cut-away portion $4^c$ of the landside 4 and which is adapted to fit in said cut-away portion $4^c$ with its outer face $12^x$ flush with the outer face $4^x$ of the landside 4, as clearly shown in Fig. 3. The rectangular portion $12^a$ has an elongaged aperture $12^e$ through which and through the aperture $4^y$ in the landside the fastening-bolt *m* passes, and the said rectangular portion $12^a$ is also apertured, as at $12^f$, to receive the bolt $n$, which passes therethrough and through the aperture $4^z$ in the landside 4 to form a pivot for the rectangular portion $12^a$.

Extending at right angles to the rectangular portion $12^a$ and integrally formed therewith is a cutter-knife $12^g$, which has the cutting edges $12^c$ $12^d$, as shown in Fig. 3, and the said cutting edges are set at an angle to the landside and in an approximately horizontal plane. In my improved construction of the knife 12 I form the cutting edges in sections $12^c$ $12^d$ having a stepped relation, the edge $12^c$ being disposed in advance of the edge $12^d$ to form a portion $12^m$ at right angles to the cutting edge, as I find that this form of knife will the more readily cut the stalks and roots than a knife with the continuous cutting edge.

While I have shown but a two-sectioned cutting-edged knife in Figs. 1, 2, and 3, yet I may make the knife with a greater number of such edges, as shown in Fig. 7, if found desirable.

From practical experience I find that for cuts, say, eighteen inches in width, the ordinary-size moldboard will suffice; but when the full-width cut is to be made I find it more advantageous to use the bars 6 and 7, mounted as before described, which will then act as auxiliary moldboard to turn the soil in the proper manner. Furthermore, by constructing the braces and connecting them to the plowshare, moldboard, and landside as shown and described is produced a more rigid and stronger plow than is possible to obtain by the ordinary construction. By making the auxiliary knife or share 12 adjustable, as shown, it may be the more readily adjusted to the desired angle to cause the plow and knife to make a deeper or shallower cut or to cause them to enter the soil to a greater or less degree.

From the foregoing description, taken in connection with the accompanying drawings, it is thought the advantages and complete operation of my invention will be readily understood by those skilled in the art to which it appertains, and while I am aware that plows have heretofore been provided having side cutting attachments, yet my invention differentiates therefrom in the peculiar construction of knife and the manner of securing the same to the landside and the peculiar construction of braces and auxiliary moldboard extension-bars, as before described.

I desire it understood that slight changes in the detail arrangement of parts may be made without departing from the scope of the appended claims.

Having thus described my invention, what I claim, and desire to secure by Letters Patent, is—

1. In a plow, the combination with a moldboard, the share and the landside, of an auxiliary moldboard extension, consisting of a plurality of bars curved in the plane of the curvature of the moldboard-body member and disposed at the outer edge of the said moldboard-body, said bars being pivotally secured at their front end to the share, and means for supporting the rear sections of the said bars, said means being connected with the moldboard-body and the landside, as set forth.

2. In a plow, the combination with share, a moldboard and a landside mounted substantially as shown; a plurality of bars curved on the longitudinal curvature of the moldboard and disposed in the plane of the outer edge of the said moldboard, said bars being pivotally connected to the plowshare, a brace member connecting one end of one of the said curved bars with the landside, and a second brace member connected to the first brace member and the other curved bar, as set forth.

3. In a plow, the combination with the landside, the moldboard and the share; of the auxiliary bar 6 pivotally joined to the plowshare, the brace member 9 connected to the bar 6 and the landside, the auxiliary bar 7, the brace-bar 8 secured to the member 9 and the rear of the moldboard, and a member 10 connected to the bar 9 and the auxiliary bar 7, substantially as shown.

4. A plow, comprising in combination with a plowshare, the moldboard and the landside having a cut-away portion, of an auxiliary cutter-knife having a plurality of cutting edges projected at right angles to the landside, said knife having a vertical portion adapted to fit said cut-away portion of the landside, with its front face flush with the corresponding face of the landside, said vertical portion having an elongated aperture, a bolt passing through said aperture and the landside to adjustably hold said knife in position, as specified.

5. A plow, comprising in combination with a plowshare, the moldboard and the landside, having a vertical cut-away portion, of an auxiliary cutter-knife having a plurality of cutting edges projected at right angles to the landside, said knife also having an integrally-formed vertical portion adapted to fit said cutaway portion of the landside with its front face flush with the corresponding face of the landside, said vertical portion having an elongated aperture, a bolt passing through said aperture and the landside to form a fulcrum for said vertical portion, said vertical portion also having an elongated aperture, a bolt passing through said elongated aperture and the landside so that the said vertical portion and the said knife portion may be set at different angles to the horizontal plane, as specified.

LAWRENCE SACK.

Witnesses:
  Jos. Sack,
  John W. Templin.